April 8, 1952   V. F. SEPAVICH ET AL   2,592,199
ELECTRIC WEFT DETECTING SYSTEM FOR DROP BOX LOOMS
Filed Dec. 6, 1949   2 SHEETS—SHEET 1
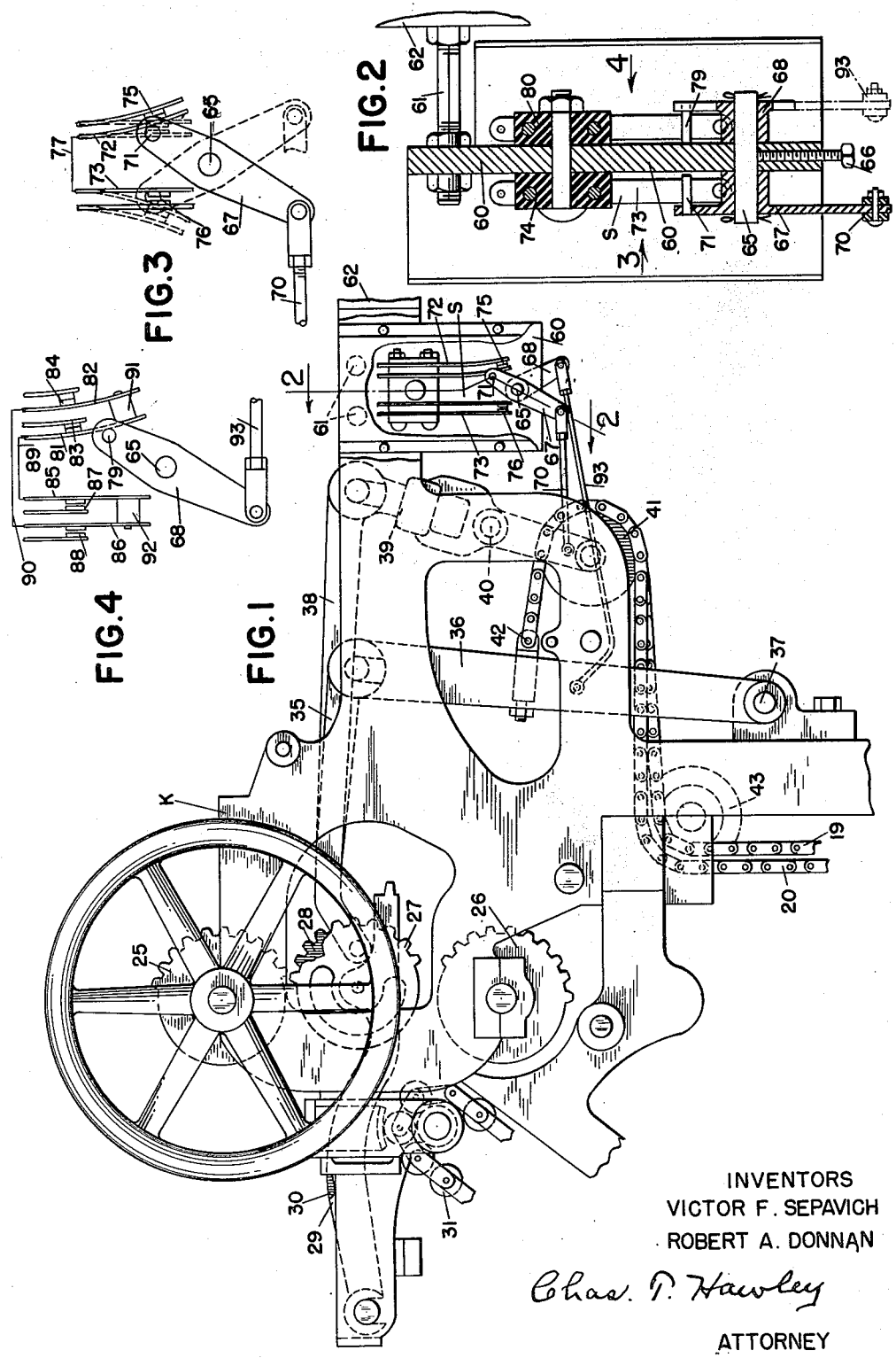
INVENTORS
VICTOR F. SEPAVICH
ROBERT A. DONNAN
Chas. T. Hawley
ATTORNEY

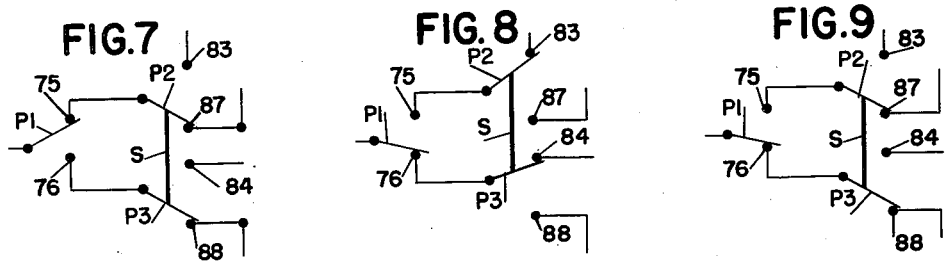
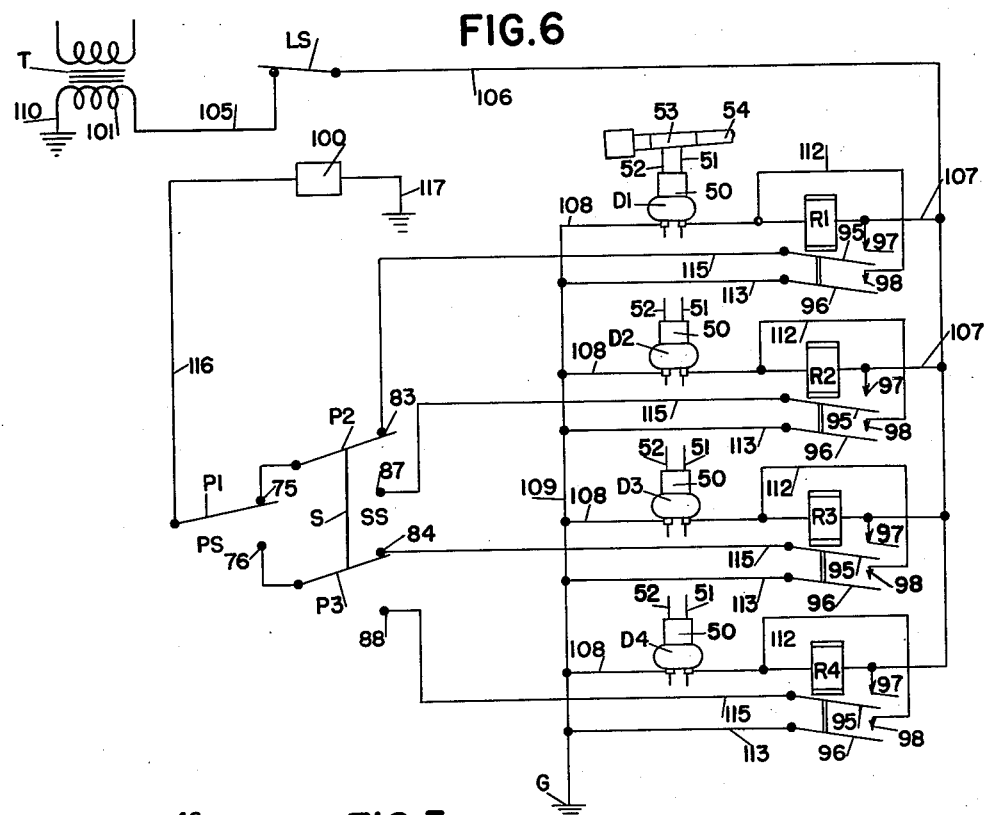
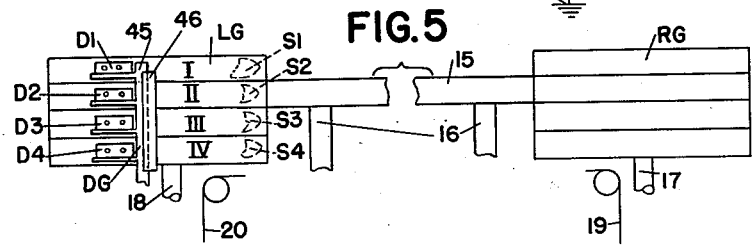
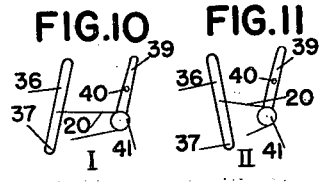 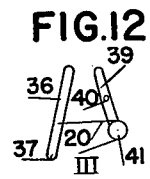 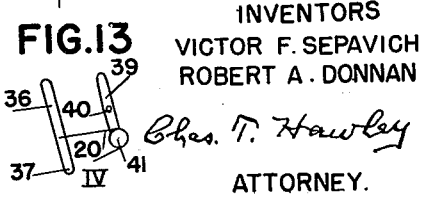
INVENTORS
VICTOR F. SEPAVICH
ROBERT A. DONNAN
Chas. T. Hawley
ATTORNEY.

Patented Apr. 8, 1952

2,592,199

UNITED STATES PATENT OFFICE 2,592,199

ELECTRIC WEFT DETECTING SYSTEM FOR DROP BOX LOOMS

Victor F. Sepavich and Robert A. Donnan, Worcester, Mass., assignors to Crompton & Knowles Loom Works, Worcester, Mass., a corporation of Massachusetts Application December 6, 1949, Serial No. 131,379

15 Claims. (Cl. 139—233)

This invention relates to improvements in electrical weft detecting systems for looms more particularly of the pick and pick type in which a depleted shuttle when moving toward active position gives indication of weft exhaustion to effect loom stoppage when the shuttle reaches the opposite side of the loom.

In the past it has been proposed to use a gang of electrical weft detectors in front of and rising and falling with a gang of shifting shuttle boxes so that each shuttle box has its own detector. In systems of this type the detection of weft generally occurs when the lay is on its front center position and while the shuttle boxes are shifting if a new shuttle is to come into action. In previously used detecting systems selection of a circuit corresponding to the shuttle box next to be active is completed before front center, and the electric connections have been such that if three of the shuttles should be empty and a fourth full shuttle moves to active position a series circuit will be completed through the three empty shuttles and their detectors to effect loom stoppage which is unnecessary and undesirable, since the shuttle in action has ample weft.

It is an important object of the present invention to provide an electrical weft detecting system wherein each weft detector has one of its electrodes connected to a common wire. By this arrangement the detectors cannot be in series with each other and the aforesaid unnecessary indication will not be given.

It is a further object of the invention to provide electric circuit means wherein each detector will be associated with a relay which will be energized to close an indicating contact when the detector closes its branch detector circuit. Each detector, when detecting a depleted shuttle which is out of action for several successive picks, is able to make repeated attempts to energize its relay even though the relay is not in a circuit corresponding to an active shuttle. In this way greater certainty of operation is attained.

It is a still further object of the invention to provide switch means having selector contacts and position the switch means by the shuttle box lifting levers of the loom and operating in such manner that only one of the indicating contacts at a time can control the loom, namely, the contact corresponding to the shuttle which will be active on the next pick.

With these and other objects in view which will appear as the description proceeds, the invention resides in the combination and arrangement of parts hereinafter described and set forth.

In the accompanying drawings, wherein a convenient embodiment of the invention is set forth, Fig. 1 is a front elevation of a shuttle box operating mechanism of the Knowles head type with the selector switches of the invention applied thereto, Fig. 2 is an enlarged vertical section on line 2—2, Fig. 1.

Fig. 3 is a diagrammatic front elevation looking in the direction of arrow 3, Fig. 2, Fig. 4 is a view similar to Fig. 3, but looking in the direction of arrow 4, Fig. 2, Fig. 5 is a diagrammatic front view of a lay and shuttle boxes and the gang of electric detectors used with the invention, Fig. 6 is a diagrammatic view of the electric circuits used with the invention, Figs. 7, 8 and 9 are detailed views showing the selector switch means in three different positions different from that shown in Fig. 6, and Figs. 10 to 13 are diagrammatic views showing the four positions which the box shifting levers can occupy.

Referring particularly to Fig. 5, only such parts of the loom are illustrated as are deemed necessary to set forth the invention. A lay 15 mounted on lay swords 16 is provided with right and left shuttle box gangs RG and LG, respectively, each having four shuttle boxes or cells. The weft detecting system is shown as associated with the gang LG the shuttle boxes of which are designated at I, II, III and IV. Gangs RG and LG are mounted on box lifter rods 17 and 18, respectively, and the vertical positions of the gangs are determined by box lifting chains 19 and 20, respectively.

During loom operation, depending upon the requirements of the pattern for the fabric being woven, the gangs RG and LG shift vertically relatively to the lay so that the shuttle boxes of each gang may be moved one at a time to active or picking position. The shuttle boxes shown in Fig. 5 are of well-known construction and operate in usual manner.

Fig. 1 shows the well known Knowles head shuttle box operating mechanism K having upper and lower cylinder gears 25 and 26, respectively, for actuation of vibrator gears indicated at 27 and 28. The vibrator gears 27 and 28 are mounted on vibrator levers 29 and 30, respectively, the vertical position of which is determined by a pattern chain 31.

In a 4x4 loom such as illustrated in Fig. 5 it is customary to have two pairs of vibrator levers, one pair for each of the gangs RG and LG, but inasmuch as the present invention is concerned with an electrical weft detecting system associated with gang LG, the vibrator gears and their connections for that gang only are shown.

A short connector 35 controlled by vibrator gear 27 is attached at its upper end to a box lifter lever 36 the lower end of which is pivoted on a fixed stud 37. A second connector 38 longer than connector 35 is attached at its upper end to a second box lifter lever 39 rocking about a fixed pivot 40. The lower end of lever 39 has rotatable thereon a sprocket wheel 41. Box lifter chain 20 for the gang LG is attached as at 42 to lever 36, is trained around sprocket 41, and then extends to the left around a guide sheave 43 and thence down to well known connections (not shown) with box lifter rod 18. The other chain 19 for the gang RG is indicated in Fig. 1, but its box lifter levers are omitted.

In the operation of the loom, cylinder gears 25 and 26 turn the vibrator levers in known manner to operate levers 36 and 39 to place any one of the four shuttle boxes I–IV in active position. Fig. 10 shows diagrammatically the position of levers 36 and 39 as they appear in Fig. 1, the part of the chain 20 connected to lever 36 being at its extreme right position and the sheave 41 being in its extreme left position. In these positions the levers allow the chain to fall to its lowest position corresponding to the location of shuttle box I in active position.

In Figure 11 the lever 36 in indicated as having been moved to the left while the lever 39 has remained stationary, this movement of lever 36 effecting a one-box shift to place shuttle box or cell II in active position. In Fig. 12 lever 36 has returned to its original position but lever 39 has been rocked so that its sheave 41 moves to the right, thereby producing a two-box shift from the position shown in Fig. 5 to locate shuttle box III in active position. In Fig. 13 the box lever 39 remains as it was in Fig. 12, but the lever 36 has been moved to the left, thereby lifting the chain 20 to its highest position to place shuttle box IV in active position.

The loom is provided with a gang DG of four electrical weft detectors D1, D2, D3 and D4, for shuttle boxes I–IV, respectively. The detectors have a common mounting 45 which rises and falls with gang LG so that the detectors D1–D4 always register with their respective shuttle boxes. The gang DG is mounted in front of the shuttle box gang LG and slides on a stationary guide 46. The shuttle boxes swing backwardly and forwardly with the lay 15, but the detectors do not move back and forth, and the weft detecting operations of the detectors occur during a period when the lay is on or near its front center position. The mechanism K operates to move the shuttle boxes LG during a shuttle box shifting interval which starts when the lay is approximately at bottom center position and continues through front center position to top center or picking position. The gang LG and the weft detectors are therefore moving vertically during the weft detecting period when the lay is on front center, if there is to be change in position of gang LG relatively to the lay.

Each detector has a body 50 made of insulating material in which are slidably mounted right and left electric conducting detector electrodes or fingers 51 and 52, respectively. Each of the shuttles S1–S4 for boxes I–IV, respectively, has a metallic ferrule 53 on a bobbin 54 which is normally covered by weft which prevents the fingers 51 and 52 from being electrically connected during the detecting period, but when weft is exhausted in any shuttle its ferrule will engege and electrically connect the corresponding detector fingers during the detecting period.

Except as noted hereinafter the matter thus far described may operate in the usual manner and of itself forms no part of the present invention.

In carrying the invention into effect the head mechanism K has mounted thereon selector switch means designated generally at S, see Figs. 1 and 6, mounted on a support 60 secured as at 61 to a part of the loom, such as arch 62. Support 60 has secured in the lower part thereof a pivot pin 65 held in position by a set screw 66 and affording pivotal support at the front and back of support 60 for switch closing levers 67 and 68, respectively. Rod 70 connects the lower parts of levers 39 and 67. Lever 67 has a switch closing pin 71, preferably made of electric insulating material, on the upper end thereof for engagement with resilient prongs 72 and 73 mounted on an insulating block 74 secured to support 60.

Prongs or blades 72 and 73 are capable of engaging contacts 75 and 76, respectively, also mounted on block 74, depending upon the position of lever 67 and pin 71. The two primary prongs 72 and 73 are electrically connected together, as indicated diagrammatically at 77, Fig. 3, and are designated diagrammatically at P1 in Fig. 6. When the lever 67 is in the position shown in full lines in Fig. 3 corresponding to active position of either of the boxes I or II, prong 72, or switch P1 in Fig. 6, will engage primary contact 75, but when either of the shuttle boxes III or IV is active lever 67 will be in the dotted line position shown in Fig. 3 and prong 73, or switch P1, Fig. 6, will engage primary contact 76. The switch prong or blade and contacts shown in Fig. 3 are designated herein for a convenience of identification as the primary contact selector means PS.

The secondary contact selector means SS is located on the back of support 60. Pin 79, similar to pin 71, is on the upper end of lever 68 and is located for control of the switches on an insulating block 80 secured to the back of plate 60. Resilient switch prongs or blades 81 and 82 are positioned for engagement respectively with contacts 83 and 84, while similar prongs 85 and 86 are positioned for engagement with contacts 87 and 88, respectively. Prongs 81 and 85 are electrically connected as indicated diagrammatically at 89, Fig. 4, and are designated at P2 in Fig. 6, while prongs 82 and 86 are electrically connected as indicated at 90, and are designated at P3 in Fig. 6. Prongs 81 and 82 are mechanically connected by an insulated washer or the like 91, and similarly prongs 85 and 86 are mechanically connected by an insulating washer 92.

The lower end of lever 68 is connected by rod 93 to box lifter lever 36, and when shuttle boxes I and III are active, see Figs. 10 and 12, lever 68 will be in the position shown in Fig. 4, corresponding to engagement of secondary blades P2 and P3 with secondary contacts 83 and 84, respectively, Fig. 6. When lever 36 has swung to the left from the position shown in Fig. 1, see Figs. 11 and 13, the position which it will occupy when either shuttle box II or IV is active, lever 68 will be rocked to the left, Fig. 4, and secondary blades P2 and P3 will engage secondary contacts 87 and 88, respectively, Fig. 6.

The primary and secondary contact selector means are collectively designated herein at S.

The electric weft detectors D1–D4 are associated with relays R1–R4, see Fig. 6, and each relay has two armatures 95 and 96 for engagement respectively with an indicating contact 97 and a holding contact 98. The relays are normally de-energized so that the armatures will be in the open position shown in Fig. 6, but when any relay is energized it will move its armatures into engagement with their contacts.

The loom is provided with a solenoid 100, which when energized sets loom stopping mechanism which later effects loom stoppage. It is not thought necessary to illustrate the particular means by which energization of the solenoid will effect loom stoppage, since such means are well known in the art, and it is though sufficient to state that when solenoid 100 is energized loom stoppage will occur when the indicating or depleted shuttle in the actively placed shuttle box in LG has reached the gang RG and before the latter starts to shift. In this way the loom stops with the depleted shuttle opposite the lay so that it can be readily removed from its shuttle box.

A shipper handle switch LS is under control of the loom driving mechanism (not shown) and will be closed whenever the loom is in operation, but will be open when the loom is stopped. Any convenient source of electric power may be utilized, such as a transformer T having a secondary 101 providing low voltage electric power for operation of the relays and solenoid.

In describing the operation of the invention it will be assumed that the gang LG has been in some position other than as shown in Fig. 5 and that shuttle box I with a depleted supply of weft will move into active position on the next pick of the loom. This other position may, for instance, be that suggested in Fig. 11 with shuttle box II active. At the start of the box shifting interval the switch prongs or blades P1, P2 and P3 will be in the position shown in Fig. 7, but as box shifting proceeds the secondary prongs P2 and P3 will move away from secondary contacts 87 and 88, and when the lay is on front center during the detecting period blades P2 and P3 will not engage any contacts.

During the detecting period all of the electric weft detectors will have a detecting operation with respect to their corresponding shuttle boxes, and since it is assumed that the shuttle in shuttle box I is depleted of weft, detector D1 will have its fingers 51 and 52 electrically connected by a ferrule 53 in shuttle box I, thereby closing the following detecting branch circuit: transformer secondary 101, wire 105, switch LS, wire 106, wire 107, relay R1, finger 51 of detector D1, the uncovered ferrule in shuttle box I, finger 52, wire 108, wire 109 to the ground G, and from ground back to the secondary winding 101 by wire 110. Closure of this branch detecting circuit will energize relay R1, whereupon its armatures 95 and 96 will engage their contacts 97 and 98. Thereupon a holding circuit for relay R1 will be completed as follows: secondary winding 101, down to wire 107 and through the relay, wire 112, holding contact 98, armature 96, wire 113, and wire 109 to ground. This circuit keeps the relay energized to maintain engagement between armature 95 and indicating contact 97 after the lay due to its rearward movement breaks the branch detector circuit through detector D1.

After the detecting period the box shifting lever 36 continues to move, and as shuttle box I reaches its picking position secondary blade P2 will engage secondary contact 83, whereupon the following branch solenoid operating circuit will be closed: secondary winding 101 down to wire 107, indicating contact 97 of relay R1 and its armature 95, wire 115, secondary contact 83, secondary blade P2, primary contact 75, primary blade P1, wire 116, solenoid 100, wire 117 to ground, and back to the secondary by wire 110. By reference to Fig. 10 it will be seen that the box lifter lever 39 is in position to maintain primary blade P1 in the position shown in Fig. 6 where it will engage primary selector contact 75 and permit closure of the last traced solenoid operating circuit. This circuit is closed at or near the completion of the box shifting interval and at about the time shuttle S1 is picked out of shuttle box I and the solenoid operates to stop the loom when the depleted shuttle reaches the gang RG, as already described. Switch LS thereupon opens and the holding circuit for relay R1 is opened, resulting in return of the armatures of relay R1 to their normal position.

Each of the other detectors could have indicated weft exhaustion and energized its relay, but no branch operating circuits can be completed through the other indicating contacts 97 of such other relays due to the fact that the secondary blade P2 has moved away from secondary contact 87 corresponding to detector D2, and secondary contacts 84 and 86 cannot be connected to wire 116 because of the position of primary blade P1.

In further description of the operation, it may be assumed for instance that shuttle S4 in shuttle box IV is depleted and is moved to active position. Detector D4 will complete the fourth branch detector circuit and will effect energization of relay R4 when the lay is at front center during the box shift. Since in order to move shuttle box IV to active position it is necessary to move the shuttle box operating levers 36 and 39 to the positions shown in Fig. 13, primary blade P1 will engage primary contact 76, Fig. 6, upon completion of the box shift, and secondary blade P3 will engage secondary contact 88, thereby closing the fourth branch solenoid operating circuit, see Fig. 9. Under this condition even though detectors D1 and D2 should indicate weft exhaustion, blade P1 is spaced from contact 75 and the operating circuits through the indicating contacts 97 corresponding to these two detectors cannot be completed, and likewise even though detector D3 should close its detecting circuit, blade P3 will be spaced from contact 84 and the operating circuit for the third detector cannot be completed. If shuttle S3 is depleted and active the selector means will be as shown in Fig. 8 and loom stoppage will result.

It will be understood from the operation thus described that each detector upon engaging an uncovered ferrule 53 can make an attempt to energize its corresponding relay, and if a depleted shuttle is out of action for three or four picks its detector will have three or four chances to energize the associated relay. This mode of operation insures greater certainty of closure of the indicating and holding contacts 97 and 98, respectively, than would be possible if the detector were connected to its relay only at the time its shuttle box moves to active position. It will further be understood that the branch detecting circuits are independent of the operating or solenoid controlling branch circuits to the extent at least that each detector can energize its relay independently of the position of the blades P1, P2 and P3, provided its shuttle box is depleted of weft. The switching means S shown at the lower left hand part of Fig. 6, including blades P1, P2 and P3, operates in such manner that even though more than one branch detecting circuit can be closed at a time, only one operating or controlling circuit can be closed through the solenoid 100.

It will further be noted in Fig. 6 that one detector finger of each detector is connected to the same side of the transformer, and the other detector finger of each detector is connected to the opposite side of the transformer, this arrangement providing several parallel circuits which cannot be placed in series with each other to give a false indication, as is possible in those systems wherein the weft detectors are interconnected. It will also be seen that one side of each of the solenoid operating branch circuits is connected by its armature and contact 97 to wire 106, hence these circuits cannot be connected in series in such a way as to give a false indication.

The box shifting levers control the primary and secondary contacts and determine which of them shall be connected to the solenoid. There is a pair of secondary contacts for each primary contact and the primary blade P1 and secondary blades P2 and P3 determine which of the indicating contacts 97 can be connected in a solenoid operating circuit.

Having thus described the invention it will be seen that changes and modifications of the foregoing specific disclosure may be made without departing from the spirit and scope of the invention.

What is claimed as new is:

1. In an electric weft detecting system for a loom having a gang of shifting shuttle boxes, shuttle box operating mechanism effective to shift the shuttle boxes relatively to the lay during a box shifting interval, a gang of electrically indicating weft detectors, one detector for each shuttle box, the gang moving during a box shifting interval to maintain each detector in register with the shuttle box corresponding thereto, said detectors capable of indicating weft exhaustion during a detecting period occurring during the shuttle box shifting interval, a source of electric power, electric circuit means providing a plurality of branch detector circuits, one branch for each detector, a relay in each branch detector circuit which is energized when the corresponding detector indicates weft exhaustion, an indicating contact for each relay closed and maintained closed by the relay subsequent to the detecting period upon closure of the associated branch detector circuit, selector electric switch means, and an electromagnetic device which when energized effects loom stoppage, said selector switch means operated by the shuttle box shifting mechanism and effective incident to closure of an indicating contact corresponding to the shuttle box next to be active to cause energization of said electromagnetic device.

2. In an electric weft detecting system for a loom having a pair of shuttle boxes which shift relatively to the lay during a box shifting interval, shuttle box operating mechanism effecting shifting of the shuttle boxes during said interval, an electrically indicating weft detector for each shuttle box capable of indicating weft exhaustion, provided the weft supply in the corresponding shuttle box is depleted, during a detecting period occurring between the start and finish of a box shifting interval, a branch detector circuit for each detector including a relay which is energized when the corresponding detector indicates weft exhaustion, an indicating contact for each relay maintained closed from the detecting period to the end of the box shifting interval whenever the corresponding relay is energized, a pair of selector contacts, an electromagnetic device effective when energized to cause loom stoppage, means controlled by the shuttle box shifting mechanism to connect the electromagnetic device to the selector contact corresponding to the shuttle box next to be in active position, and a branch operating electric circuit means connecting each indicating contact to the corresponding selector contact, each branch detecting circuit effective to cause energization of said electromagnetic device provided the corresponding indicating contact is closed and the closed indicating contact corresponds to the shuttle box next to be active.

3. In an electric weft detecting system for a loom having a lay provided with a gang of shuttle boxes which shift during a box shifting interval starting when the lay is substantially on bottom center and ending when the lay is substantially on top center, a gang of electrically indicating weft detectors, one detector for each shuttle box, movable during said interval to maintain each detector in register with the corresponding shuttle box, each detector capable of indicating weft exhaustion in the corresponding shuttle box when the lay is substantially on front center, shuttle box shifting mechanism moving said shuttle boxes during said shifting interval, an indicating contact for each detector, a branch detector circuit for each detector effective when closed by the detector to cause closure of the corresponding indicating contact and maintain the latter closed subsequent to the detecting period, a plurality of selector contacts, one for each indicating contact, an electromagnetic device effective when energized to cause loom stoppage, a branch operating electric circuit for each indicating contact and associated selector contact, and electric means controlled by the shuttle box shifting mechanism connecting the branch operating circuit corresponding to the shuttle box next to be active to said electromagnetic device, provided the corresponding indicating contact is closed, closure of any branch operating circuit causing energization of said electromagnetic device.

4. In an electric weft detecting system for a loom having a lay provided with a gang of shuttle boxes which shift during a box shifting period starting when the lay is substantially on bottom center and continuing until the lay is substantially on top center, shuttle box shifting mechanism moving said shuttle boxes during said interval, a gang of electrically indicating weft detectors, one detector for each shuttle box, moving during said interval to maintain each detector in register with the corresponding shuttle box, a branch electric detector circuit for each weft detector closed when the lay is substantially on front center position thereof during a detecting period, provided the weft detector indicates weft exhaustion, an electromagnetic device effective when energized to cause loom stoppage, a branch electric operating circuit for said device for each branch detector circuit, electric selector means operated by the shuttle box shifting mechanism selecting the branch operating circuit corresponding to the shuttle box next to be in active position and connecting the selected branch operating circuit to the electromagnetic device, and an indicating contact for each branch operating circuit closed and maintained closed to the end of the shuttle box shifting interval incident to closure of the corresponding detector circuit and closing the selected operating circuit to energize said device at the end of said shuttle box shifting interval.

5. In an electrical weft detecting system for a loom having a gang of shuttle boxes which shift with respect to the lay during a shuttle box shifting interval starting when the lay is substantially at bottom center and ending when the lay is substantially at top center, shuttle box operating mechanism shifting said shuttle boxes during said interval, a gang of electrically indicating weft detectors, one detector for each shuttle box, shifting during said interval to maintain each detector in register with the corresponding shuttle box, a normally open indicating contact for each weft detector, a selector contact for each indicating contact, an electromagnetic device effective when energized to cause loom stoppage, a branch detector circuit for each detector effective when the latter indicates weft exhaustion to close the associated indicating contact and connect the latter to the corresponding selector contact and maintain said indicating contact closed to the end of the indicating interval, and selector switch means operated by the shuttle box operating mechanism effective to connect the electromagnetic device to the selector contact corresponding to the shuttle box next to be active at the end of a box shifting interval, whereupon an indicating contact closed during the detecting period and remaining closed to the end of said interval, if connected to a selector contact corresponding to the shuttle box next to be active, is capable of energizing said electromagnetic device.

6. In an electric weft detecting system for a loom having a lay provided with a gang of shuttle boxes which shift during an interval starting when the lay is substantially on bottom center and ending when the lay is substantially on top center, a gang of electrically indicating weft detectors, one detector for each shuttle box, moving during said interval to maintain each detector in register with the corresponding shuttle box, each detector detecting weft in the corresponding shuttle box when the lay is substantially on front center, an indicating contact for each detector closed during the detecting period, provided the associated detector indicates weft exhaustion, selector switch means operating in timed relation with the shuttle boxes during said interval and including a selector contact for each indicating contact, an electromagnetic device effective upon energization to cause loom stoppage, the selector switch means effective near the end of a box shifting interval to connect the selector contact corresponding to the shuttle box next to be active to said electromagnetic device and the indicating contact corresponding to the last named selector contact, if closed, effecting energization of said electromagnetic device.

7. In an electric weft detecting system for a loom having a lay provided with a gang of shuttle boxes which shift during an interval starting when the lay is substantially at bottom center and ending when the lay is substantially at top center, an indicating contact for each shuttle box, an electric weft detector for each shuttle box, means effective during a detecting period occurring during a shuttle box shifting interval when the lay is near the front center position thereof to close and maintain closed until the end of said interval the indicating contact corresponding to any shuttle box containing a depleted supply of weft, an electromagnetic device effective when energized to cause loom stoppage, and selector switch means operative at the end of said box shifting interval to connect the indicating contact corresponding to the shuttle box next to be active to said electromagnetic device and preventing electrical connection of the remaining indicating contacts to said device.

8. In an electrical weft detecting system for a loom having shuttle boxes which shift relatively to the lay during a shifting interval, a gang of electrically indicating weft detectors, one detector for each shuttle box, shifting during said interval to maintain each detector in register with the corresponding shuttle box, each detector having two electrodes, a source of electric power, a plurality of detector circuits, one for each detector, each detector circuit connecting one of the electrodes of the associated detector to one side of said source and connecting the other electrode to the other side of said source, whereby said detector circuits are simultaneously in parallel, all of said detector circuits capable of simultaneous closure provided the weft supplies in the corresponding shuttle boxes are depleted, mechanism effecting shifting of said shuttle boxes during said interval, loom controlling electric circuit means effective when closed to stop the loom, and selector switch means controlled by said mechanism and forming part of the loom controlling electric circuit means and dependent upon closure of the detector circuit corresponding to the next shuttle box to be active to effect closure of the loom controlling circuit means.

9. In an electric weft detecting system for a loom having a gang of shifting shuttle boxes which move during a shifting interval and having an electromagnetic device which when energized effects loom stoppage, a gang of electrically indicating weft detectors, one detector for each shuttle box, the gang shifting during said box shifting interval to maintain each detector in register with the corresponding shuttle box, each detector capable of detecting weft during a detecting period occurring between the start and finish of a box shifting interval and each detector having two electrodes, a source of electric power, a branch electric detector circuit for each detector including a relay, each branch connecting one of the electrodes of the associated detector to one side of said source and connecting the other electrode of the detector to the other side of said source, each detector when indicating weft exhaustion during a detecting period closing the corresponding branch detector circuit and energizing the corresponding relay, an indicating contact for each relay closed and maintained closed by the relay subsequent to the detecting period when the relay is energized, selector switch means, shuttle box shifting mechanism controlling the selector switching means effective subsequent to a detecting period to connect the indicating contact corresponding to the shuttle box next to be in active position to the electromagnetic means, providing the indicating contact is closed, and operating circuit means including said closed indicating contact and electromagnetic device effective to energize the latter.

10. In an electric weft detecting system for a loom having shuttle boxes which shift relatively to the lay during a box shifting interval starting when the lay is substantially on bottom center and ending when the lay is substantially at top center, a box shifting mechanism moving the shuttle boxes during said interval, an electric weft detector for each shuttle box capable of indicating weft exhaustion during a detecting period occurring between the start and finish of said interval when the lay is near the front center position thereof, electric means storing an indication of weft exhaustion given by any detector from the detecting period to the end of the box shifting interval, loom controlling electric circuit means, and selector electric switch means controlled by said mechanism effective to close the loom controlling circuit means at the end of said interval, provided there is a stored indication of weft exhaustion corresponding to the shuttle box in active position at the end of said interval, said selector switch means preventing closure of the loom controlling circuit means incident to the storage of indication of weft exhaustion corresponding to any other shuttle box.

11. In an electric weft detecting system for a loom having shifting shuttle boxes, an electric weft detector for each shuttle box, an electromagnetic device to effect loom stoppage when energized, a branch detector circuit for each detector, a branch operating circuit for the device corresponding to each detector branch, an indicating contact in each operating branch closed when the associated detector branch is closed, and selector electric switch means causing the branch operating circuit corresponding to the shuttle box next to be active to energize said device, provided the corresponding indicating contact is closed, and preventing electrical connection of the remaining operating branch circuits with said device.

12. In an electric weft detecting system for a loom having a lay provided with a gang of shuttle boxes which shift during an interval in the cycle of the loom, an indicating contact for each shuttle box, an electric weft detector for each shuttle box, electric means effective during the box shifting interval to close and maintain closed until the end of said interval the indicating contact corresponding to any shuttle box containing a depleted weft supply, an electromagnetic device effective when energized to cause loom stoppage, mechanism shifting said shuttle boxes during said interval and including box shifting levers, selector switch means controlled by the mechanism open during said interval due to movement of one or more of said levers in the event that a shuttle box shift occurs during said interval, said selector switch means closed by said levers at the end of said interval and effective to connect the indicating contact corresponding to the shuttle box in active position at the end of said interval to said electromagnetic device and preventing electrical connection of the remaining indicating contacts to said device, and electric circuit means including said device, selector switch means, and the indicating contact corresponding to the shuttle box in active position, provided the latter indicating contact is closed, effective to energize said device.

13. In an electric weft detecting system for a loom having a lay provided with a gang of four shuttle boxes which shift during an interval in the cycle of the loom operation, an indicating contact for each shuttle box, an electric weft detector for each shuttle box, each detector capable of having a detecting operation during each box shifting interval and each detector when indicating weft exhaustion effecting closure of the corresponding indicating contact, an electromagnetic device effective when energized to cause loom stoppage, shuttle box shifting mechanism including two levers at least one of which moves for each shifting of the shuttle boxes, selector electric switch means including two primary selector contacts connectable one at a time by one of said levers to the electromagnetic device, said selector electric switch means including also two pairs of secondary selector contacts, one secondary contact for each indicating contact, controlled by the other lever, each primary contact corresponding to a pair of secondary contacts and each primary contact being connectable by said other lever to one or the other of the secondary contacts of the associated pair of contacts, depending upon the position of said other lever, and electric circuit means including the electromagnetic device, selector electric switch means, and the indicating contact of the shuttle box in active position at the end of said shifting interval effective to energize said device, provided the last named indicating contact is closed.

14. In an electric weft detecting system for a loom having a lay provided with a gang of four shuttle boxes which shift during an interval occurring in the cycle of loom operations, an electric weft detector for each shuttle box, an indicating contact for each detector, each detector capable of having a detecting operation during a detecting period occurring in each box shifting interval and effective when indicating weft exhaustion in the corresponding shuttle box to close the corresponding indicating contact, means maintaining any indicating contact closed during the detecting period to remain closed to the end of the box shifting interval, mechanism shifting said shuttle boxes during said interval including two shuttle box lifting levers at least one of which moves during said interval if the boxes shift during the interval, selector electric switch means including a selector contact electrically connected to each indicating contact when the latter is closed, an electromagnetic device effective when energized to cause loom stoppage, and connections between said levers and said selector switch means opening the latter during any interval in which a box shift occurs and preventing electrical connection of any of said selector contacts with said device during the detecting but connecting the selector contact corresponding to the shuttle box in active position at the end of said interval to the electromagnetic device, and electric circuit means effective to energize said device when the selector contact corresponding to the shuttle box in active position is connected to the corresponding indicating contact, provided the latter is closed.

15. In an electric weft detecting system for a loom having a lay provided with a gang of four shuttle boxes which when shifting relatively to the lay shift during a box shifting interval occurring during the cycle of the loom, an electric weft detector for each shuttle box, an indicating contact for each weft detector, each weft detector performing a detecting operation during a detecting period in each interval and effective when indicating weft exhaustion in the corresponding shuttle box to cause the associated indicating contact to be closed at the end of the shifting interval, mechanism for shifting the shuttle boxes including two levers each capable of occupying two positions, an electromagnetic device effective when energized to cause loom stoppage, primary selector electric switch means including two primary contacts controlled by one of said levers, secondary selector electric switch means including four secondary contacts, one for each shuttle box and indicating contact, controlled by the other lever, the latter in one position thereof effective to connect one of said secondary contacts to one of said primary contacts and connect another of said secondary contacts to the other of the primary contacts, said other lever in the other position thereof connecting a third secondary contact to said one primary contact and connecting the fourth secondary contact to the other primary contact, said one lever in one position thereof connecting said one primary contact to said device and when in the other position thereof connecting the other primary contact to said device, and electric circuit means including said electromagnetic device, the indicating contact if closed corresponding to the shuttle box in active position at the end of a box shifting interval, the secondary contact corresponding to said shuttle box, and one of said primary contacts effective to energize said electromagnetic device.

VICTOR F. SEPAVICH.
ROBERT A. DONNAN.

REFERENCES CITED

The following references are of record in the file of this patent:

UNITED STATES PATENTS

| Number | Name | Date |
|---|---|---|
| 1,834,360 | Wakefield | Dec. 1, 1931 |
| 2,049,584 | Gordon | Aug. 4, 1936 |
| 2,485,139 | Bergstrom et al. | Oct. 18, 1949 |